United States Patent [19]

Solomon et al.

[11] Patent Number: 5,579,530
[45] Date of Patent: Nov. 26, 1996

[54] METHOD AND APPARATUS FOR DYNAMICALLY ALLOCATING ACCESS TIME TO A RESOURCE SHARED BETWEEN A PERIPHERAL BUS AND A HOST BUS BY DYNAMICALLY CONTROLLING THE SIZE OF BURST DATA TRANSFERS ON THE PERIPHERAL BUS

[75] Inventors: Gary Solomon; Jeff Harness, both of Hillsboro; Sudarshan B. Cadambi, Portland, all of Oreg.

[73] Assignee: Intel Corporation, Santa Clara, Calif.

[21] Appl. No.: 389,078

[22] Filed: Feb. 14, 1995

Related U.S. Application Data

[63] Continuation of Ser. No. 897,335, Jun. 11, 1992, abandoned.

[51] Int. Cl.$^6$ .............................. G06F 13/36; G06F 13/14
[52] U.S. Cl. ........................ 395/855; 395/550; 395/828; 395/845; 395/853
[58] Field of Search ...................................... 395/275, 500, 395/200, 550, 853, 855, 845, 828

[56] References Cited

U.S. PATENT DOCUMENTS

| | | | |
|---|---|---|---|
| 3,824,344 | 7/1974 | James et al. ................................. | 179/1 |
| 4,403,286 | 9/1983 | Fry et al. ................................. | 364/200 |
| 4,547,845 | 10/1985 | Ross ......................................... | 364/200 |
| 5,193,193 | 3/1993 | Iyer ......................................... | 395/725 |
| 5,216,345 | 6/1993 | Eyerly ...................................... | 318/685 |
| 5,220,659 | 6/1993 | Larson et al. ............................ | 395/500 |
| 5,237,670 | 8/1993 | Wakerly .................................... | 395/425 |
| 5,278,974 | 1/1994 | Lemmon et al. ......................... | 395/550 |
| 5,280,598 | 1/1994 | Osaki et al. .............................. | 395/425 |
| 5,377,327 | 12/1994 | Jain et al. ................................. | 395/200 |

*Primary Examiner*—Thomas C. Lee
*Assistant Examiner*—Rehana Perveen Krick
*Attorney, Agent, or Firm*—Blakely, Sokoloff, Taylor & Zafman

[57] ABSTRACT

A method and apparatus for dynamically tuning a shared resource's bandwidth utilization, which enables system I/O software to control the length of burst accesses of a shared resource by peripheral components coupled to a peripheral component bus. The present mechanism enables the system I/O software to conduct empirical tests of bandwidth utilization by bus masters accessing the shared resource over the peripheral component bus. Based upon the empirical tests, the system I/O software can tune bandwidth utilization to attain a balance between peripheral component bus performance, and host bus performance.

28 Claims, 4 Drawing Sheets

METHOD AND APPARATUS FOR DYNAMICALLY ALLOCATING ACCESS TIME TO A RESOURCE SHARED BETWEEN A PERIPHERAL BUS AND A HOST BUS BY DYNAMICALLY CONTROLLING THE SIZE OF BURST DATA TRANSFERS ON THE PERIPHERAL BUS

This is a continuation of application Ser. No. 07/897,335, filed Jun. 11, 1992, now abandoned.

BACKGROUND OF THE INVENTION

1. Field of the Invention

This invention relates to the field of computer system architecture. More particularly, this invention relates to mechanisms for controlling bus bandwidth utilization for a shared resource.

2. Background

In a computer system, peripheral components, such as disk drive controllers, network controllers, and graphics controllers, may be coupled to peripheral component buses separate from a host, or CPU bus. There are several reasons a system might employ peripheral component buses. For example, it may be desirable to isolate slower speed devices from higher bandwidth buses and peripherals. Also, an intelligent peripheral component may have a local peripheral component bus. Moreover, the system may have more peripheral components than can be reliably placed on the host bus, due to electrical loading effects.

In such a system, a host bridge circuit enables communication between the peripheral component bus and a host bus. The host bridge circuit can also enable access to a shared resource from both buses. In the case of a shared main memory resource comprised of DRAM, the host bridge circuit receives DRAM access requests from peripheral components coupled to the peripheral component bus, and in turn performs the requested accesses of DRAM.

However, highly active peripheral components coupled to the peripheral component bus can adversely impact host bus to DRAM performance. In particular, peripheral components capable of extended burst transfers over the peripheral component bus can effectively lock out DRAM accesses from the host bus. The effect of peripheral component bandwidth on host bus performance varies with system configuration. The variables include the number of peripheral components coupled to the peripheral bus, the types of peripheral components coupled to the peripheral component bus, the software applications run on the system, and the demands the CPU has on DRAM (i.e. execution bandwidth load).

Past host bridge circuits simply buffered data for the shared resource without regard for system configuration, and without hardware or software mechanisms to balance loading of the shared resource. With past host bridge circuits, the more peripherals accessing the shared resource, and the higher the bandwidth of the peripherals, the greater the adverse impact on host bus performance.

To minimize the adverse effect on host to shared resource utilization caused by very active components on a peripheral component bus competing for the shared resource, it is desirable to provide a mechanism for the system I/O software to tune the dynamics of bandwidth utilization for the peripheral components. Such a mechanism would enable the system I/O software to conduct empirical tests to determine the proper balance between peripheral component bus performance and host bus performance when accessing the shared resource.

As will be described, the present method and apparatus provides a mechanism that enables system I/O software to dynamically tune peripheral component bandwidth utilization. The present method and apparatus enables the system I/O software to establish the maximum amount of data allowed for a given burst access of a shared resource by the peripheral components.

SUMMARY OF THE INVENTION

A method and apparatus for dynamically tuning a shared resource bandwidth utilization is disclosed. The present mechanism enables system I/O software to establish the maximum amount of data allowed for burst accesses of a shared resource by peripheral components coupled to a peripheral component bus.

A host bridge circuit enables communication between bus agents coupled to a host bus, and bus agents coupled to the peripheral component bus, and enables access to the shared resource from both buses. The host bridge circuit maintains a programmable burst counter and a write buffer. The system I/O software loads a value into the programmable burst counter, which controls the maximum length of the burst accesses over the peripheral component bus to the shared resource.

When a bus master performs a burst write access of the shared resource over the peripheral component bus, the host bridge circuit posts the received data into the write buffer. When the write buffer becomes full, the host bridge circuit decrements the burst counter, indicating that one of the allowable burst data accesses has been transferred.

If the burst access has not completed, the host bridge circuit signals wait states over the peripheral component bus to stall the bus master while transferring the write buffer data to the shared resource. After the contents of the write buffer have been flushed to the shared resource, the burst access is allowed to proceed if the burst counter has not expired. When the burst sequence is complete, the burst counter is reset to the preprogrammed value.

If more data is pending for the burst access when the burst counter expires, the host bridge circuit signals a "slave termination request" which causes the peripheral component bus master to terminate the burst sequence. Thereafter, the write buffer is flushed to the shared resource and the burst counter is reset to the preprogrammed value.

When a bus master performs a burst read access of the shared resource over the peripheral component bus, the read data is transferred without buffering. The burst counter establishes the maximum amount of data allowed for both read and write burst accesses. Alternatively, separate read and write burst counters may be employed.

The present mechanism enables the system I/O software to conduct empirical tests of bandwidth utilization by bus masters accessing the shared resource over the peripheral component bus. Based upon the empirical tests, the system I/O software can tune bandwidth utilization to attain a balance between peripheral component bus performance, and host bus performance.

DETAILED DESCRIPTION OF THE INVENTION

A method and apparatus is disclosed for dynamically tuning shared resource bandwidth utilization by enabling system I/O software to control the length of burst accesses to a shared resource by peripheral components coupled to a peripheral component bus. In the following description, for purposes of explanation, specific circuit devices, circuit architectures and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
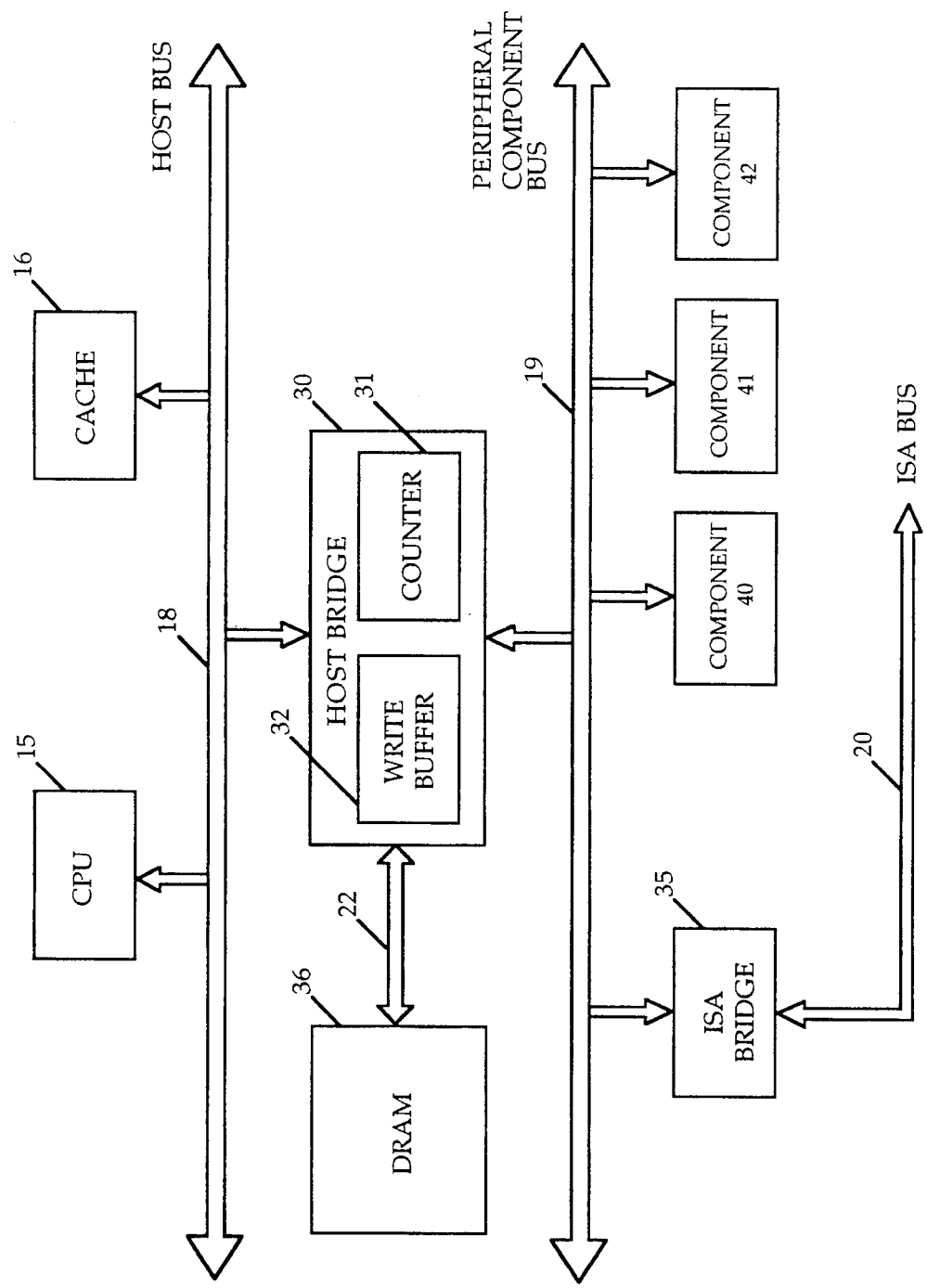
FIG. 1 illustrates an example computer system employing the teachings of the present invention, including a hierarchical arrangement of buses comprising a host bus, a peripheral component bus, and an ISA bus.

FIG. 1 illustrates an example computer system employing the teachings of the present invention. A CPU 15 and a cache subsystem 16 are shown coupled for communication over a host bus 18. In the current embodiment, the host bus 18 provides a 32 bit memory address space and a 16 bit I/O address space.

A host bridge circuit 30 enables communication between bus agents coupled to the host bus 18, and bus agents coupled to a peripheral component bus 19. An ISA bridge circuit 315 enables communication between bus agents coupled to the peripheral component bus 19, and bus agents coupled to an ISA bus 20.

Peripheral components 40–42 are bus agents coupled for communication over the peripheral component bus 19. In addition, the host bridge circuit 30 and the ISA bridge circuit 35 are coupled as bus agents for communication over the peripheral component bus 19. In the current embodiment, the host bridge circuit 30 and the ISA bridge circuit 35 have the capability to be masters and slaves for access cycles over the peripheral component bus 19.

In the current embodiment, the peripheral component bus 19 comprises 32 bit memory address and 32 bit I/O address spaces, with the addresses and data multiplexed over the same bus lines. For further discussion of a peripheral component bus consistent with the teachings of the present invention, refer to related application Ser. No. 07/876,577, (now U.S. Pat. No. 5,467,295), filed on Apr. 30, 1992, A Signalling Protocol for a Peripheral Component Interconnect and incorporated fully herein by reference.

Bridge circuits, such as the host bridge circuit 30 and the ISA bridge circuit 35, are each coupled to a primary bus and a secondary bus. A bridge circuit enables an access request that initiates on the primary bus to have a destination on the secondary bus, and enables an access request that initiates on the secondary bus to have a destination on the primary bus.

For example, the host bridge circuit 30 receives access requests over the host bus 18, and initiates peripheral component bus 19 access requests to communicate with the peripheral components 40–42, and bus agents on the ISA bus 20 through the ISA bridge circuit 35. Also, the host bridge circuit 30 receives access requests over the peripheral component bus 19, and initiates host bus 18 access requests to communicate over the host bus 18.

Similarly, the ISA bridge circuit 35 receives access requests over the ISA bus 20, and initiates peripheral component bus 19 access requests to communicate with the peripheral components 40–42, and the host bridge circuit 30. Also, the ISA bridge circuit 35 receives access requests over the peripheral component bus 19, and initiates ISA bus 20 access requests to communicate over the ISA bus 20.

In the current embodiment, the host bridge circuit 30 enables access to a shared DRAM subsystem 36. The host bridge circuit 30 receives access requests for the DRAM subsystem 36 over the host bus 18, and the peripheral component bus 19. Bus masters coupled to the peripheral component bus 19 access the DRAM subsystem 36 by initiating an access cycle on the peripheral component bus 19, and by broadcasting an address within a range of addresses allocated to the DRAM subsystem 36. The peripheral components 40–42, and the ISA bridge circuit 35 can each assume the role of bus master and access the DRAM subsystem 36 over the peripheral component bus 19, through the host bridge circuit 30.

When the host bridge circuit 30 receives a write access request over the peripheral component bus 19 destined for the DRAM subsystem 36, the host bridge circuit receives and "posts" the write data into a write buffer 32. Thereafter, the host bridge circuit 30 "flushes" the posted data from the write buffer 32 to the DRAM subsystem 36 over a DRAM bus 22.

In the current embodiment, the host bridge acts as a cache controller for the cache subsystem 16. The write buffer 32 holds four double words, equivalent to 16 bytes of data, which corresponds to the cache line size for the cache subsystem 16. The host bridge circuit 30 schedules write buffer 32 flushing, and cache line snooping to occur on 16 byte cache line boundaries. The write buffer 32 is a target for bus masters coupled to the peripheral component bus 19. Bus masters on the peripheral component bus 19, such as the ISA bridge circuit 35, and the peripheral components 40–42, can access the write buffer 32 with no wait states when the write buffer 32 is not full.

The present tunable bandwidth utilization mechanism enables the system I/O software to conduct empirical tests of bandwidth utilization of bus masters accessing the DRAM subsystem 36 over the peripheral component bus 19. Based upon the empirical tests, the system I/O software can tune bandwidth utilization of the peripheral component bus 19 bus masters. The system I/O software can tune bandwidth utilization to attain a balance between bandwidth over the peripheral component bus 19, and accessibility of the shared resource (in this example the DRAM subsystem 36) from the CPU 15.

In the current embodiment, the system I/O software is executed by the CPU 15. The CPU 15 loads a burst counter 31 over the host bus 18 with a value indicating the maximum number of data lines that may be transferred during a single burst access over the peripheral component bus 19. Thereafter, the system I/O software can test access performance of the DRAM subsystem 36 by the CPU 15, while bus masters coupled to the peripheral component bus 19 perform burst accesses of the DRAM subsystem 36.

If the CPU 15 is unable to access the DRAM 36 frequently enough to handle the execution load, the system I/O software can load the burst counter 31 with a new value to reduce the maximum number of data lines allowed for a single burst access to the DRAM 36 from the peripheral component bus 19. On the other hand, if the CPU 15 to DRAM 36 throughput is sufficient, the system I/O software can load the burst counter 31 with a new value to increase the maximum number of data lines allowed for a single burst access to the DRAM 36 from the peripheral component bus 19. By controlling the value stored in the burst counter 31, the system I/O software can tune the bandwidth utilization of bus masters coupled to the peripheral component bus 19 for DRAM 36 accesses.

Figure 2:
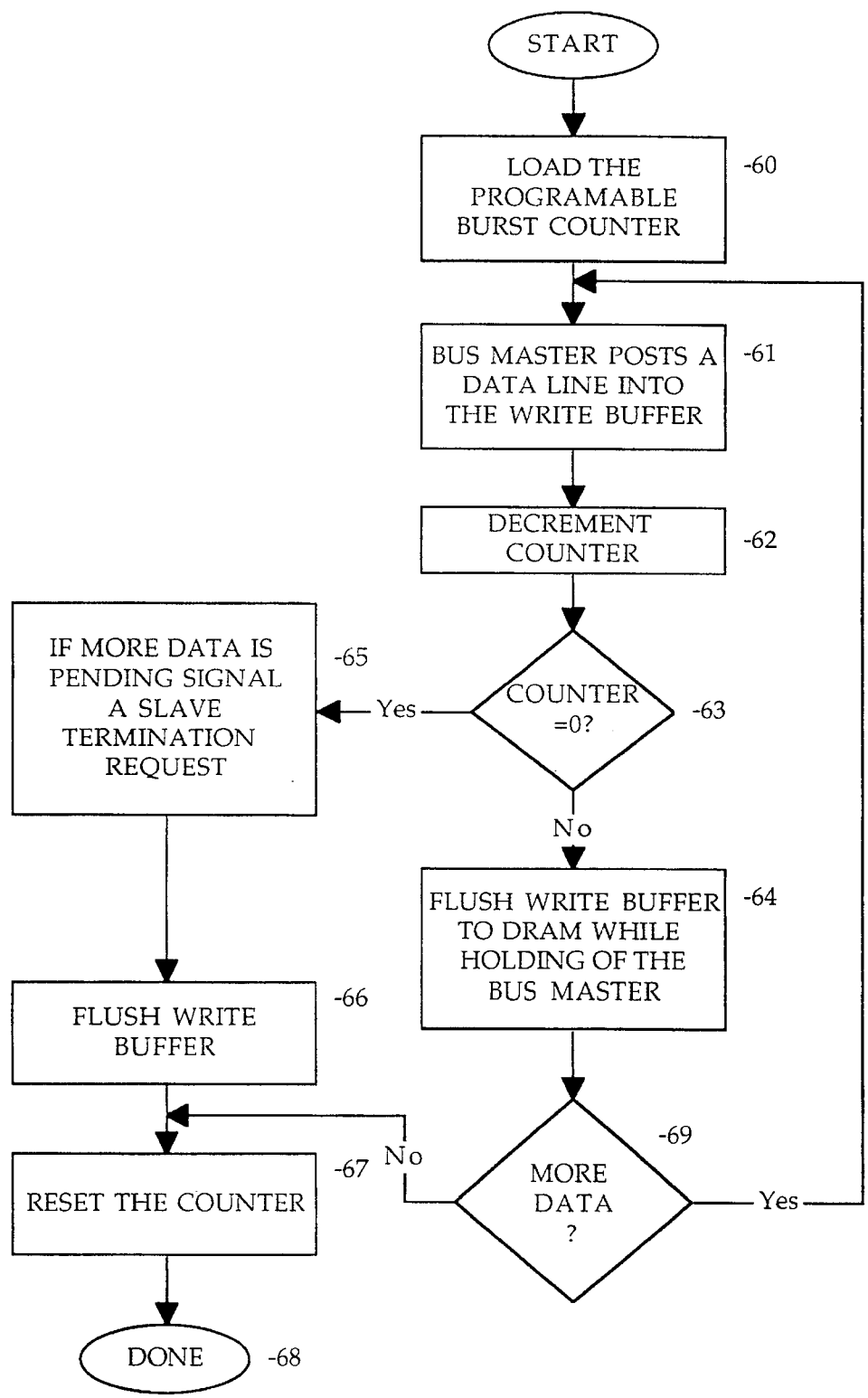
FIG. 2 provides a flow diagram illustrating the operation of an example host bridge circuit when implementing the present tunable bandwidth utilization mechanism.

FIG. 2 provides a flow diagram illustrating the operation of the host bridge circuit 30 to implement the present tunable bandwidth utilization mechanism. For this example, the system I/O software is executed by the CPU 15. At block 60, the CPU 15 loads a value into the programmable burst counter 31. The value stored in the burst counter 31 determines the maximum number of burst accesses over the peripheral component bus 19 to the DRAM subsystem 36.

Prior to block 61, a burst write access over the peripheral component bus 19 to the DRAM subsystem 36 begins. The bus master initiating the burst write access, either the ISA bridge circuit 35, or one of the peripheral components 40–42, transfers a sequence of double words of data to the host bridge circuit 30 in burst mode. For a description of a burst mode write access over the peripheral component bus 19 that is consistent with the teachings of the present tunable bandwidth utilization mechanism, refer to related application Ser. No. 07/876,577 (now U.S. Pat. No. 5,467,295), filed on Apr. 30, 1992, entitled A Signalling Protocol for a Peripheral Component Interconnect.

At block 61, the host bridge circuit 30 posts a data line into the write buffer 32. In the current embodiment, the write buffer 32 holds four double words of data, equivalent to 16 bytes, which matches the data line size for the cache memory 16. It should be noted that the present tunable bandwidth utilization mechanism does not rely on the size of data lines stored in the write buffer 32.

At block 62, the host bridge circuit 30 decrements the burst counter 31, indicating that one of the allowable burst data lines has been transferred. At decision block 63, the number of remaining allowable data lines for the current burst access is checked. If the value held by the burst counter 31 is not zero, then more data lines are allowed in the burst access, and control proceeds to block 64. At block 64, the host bridge circuit 30 flushes the contents of the write buffer 32 to the DRAM subsystem 36 over the DRAM bus 22.

While the host bridge circuit 30 flushes the write buffer 32, the host bridge circuit 30 signals a wait state over the peripheral component bus 19 to hold off transfer of the next double word of the burst sequence, if the burst access has not completed. After the contents of the write buffer 32 have been flushed to the DRAM subsystem 36, control proceeds to decision block 69 to check for more data in the burst sequence.

At block 69, if more data is pending for the current burst write access, control proceeds back to block 61 where another data line is posted into the write buffer 32. If the burst sequence is complete at block 69, then control proceeds to block 67, where the burst counter 31 is reset to the preprogrammed value set by the CPU 15 at block 60.

At decision block 63, if the burst counter 31 has expired to zero, control proceeds to block 65. At block 65, if more data is pending for the burst sequence, the host bridge circuit 30 signals a "slave termination request," thereby causing the peripheral component bus 19 bus master to terminate the burst access sequence. The bus master releases control of the peripheral component bus 19. The bus master may or may not request control of the peripheral component bus 19 at a later time to complete the transaction.

At block 66, the host bridge circuit 30 flushes the contents of the write buffer 32 to the DRAM subsystem 36. At block 67, the burst counter 31 is reset to the preprogrammed value set by the CPU 15 at block 60. Thereafter, the host bridge circuit 30 can accept a DRAM access request over the host bus 18, or another DRAM access request over the peripheral component bus 19.

When a bus master performs a burst read access of the shared resource over the peripheral component bus 19, the read data is transferred without buffering. When a double word of read data is transferred, the host bridge circuit 30 decrements the burst counter 31, indicating that one of the allowable read burst data lines has been transferred. The burst counter 31 establishes the maximum length of a read burst access. Alternatively, separate burst counters may be used for read burst and write burst accesses.

The burst read access is allowed to proceed if the burst counter has not expired. When the read burst sequence is complete, the burst counter is reset to the preprogrammed value. If more data is pending for the read burst access when the burst counter expires, the host bridge circuit 30 signals a "slave termination request" which causes the peripheral component bus 19 bus master to terminate the read burst sequence.

Figure 3:
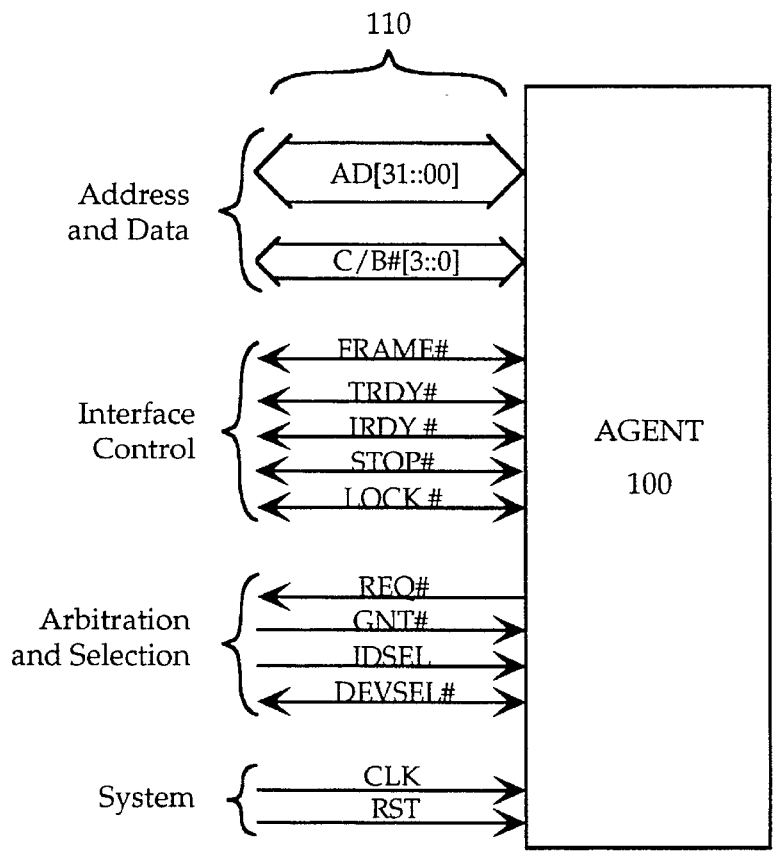
FIG. 3 shows an example bus agent that is consistent with the teachings of the present invention, including the bus signals implemented on the peripheral component bus.

Referring to FIG. 3, an example bus agent 100 that is consistent with the teachings of the present invention is shown. The bus agent 100 illustrates bus signals implemented on the peripheral component bus 19, and supported by the peripheral components 40–42, the host bridge circuit 30, and the ISA bridge circuit 35.

Bus signals 110 are carried over the peripheral component bus 19. Addresses and data are transferred at separate times over the 32 AD bus lines. The C/BE bus lines indicate bus command and byte enable information. Basic control information is transferred over a FRAME#, a TRDY#, an IRDY#, a STOP#, and a LOCK# bus signal. Bus arbitration and selection functions are provided by a REQ#, a GNT#, an IDSEL# and a DEVSEL# bus signal. Synchronization is provided by a CLK bus signal. For a detailed description of these bus signals refer to related application Ser. No. 07/876,577, (now U.S. Pat. No. 5,467,295), filed on Apr. 30, 1992, entitled A Signalling Protocol for a Peripheral Component Interconnect.

Figure 4:
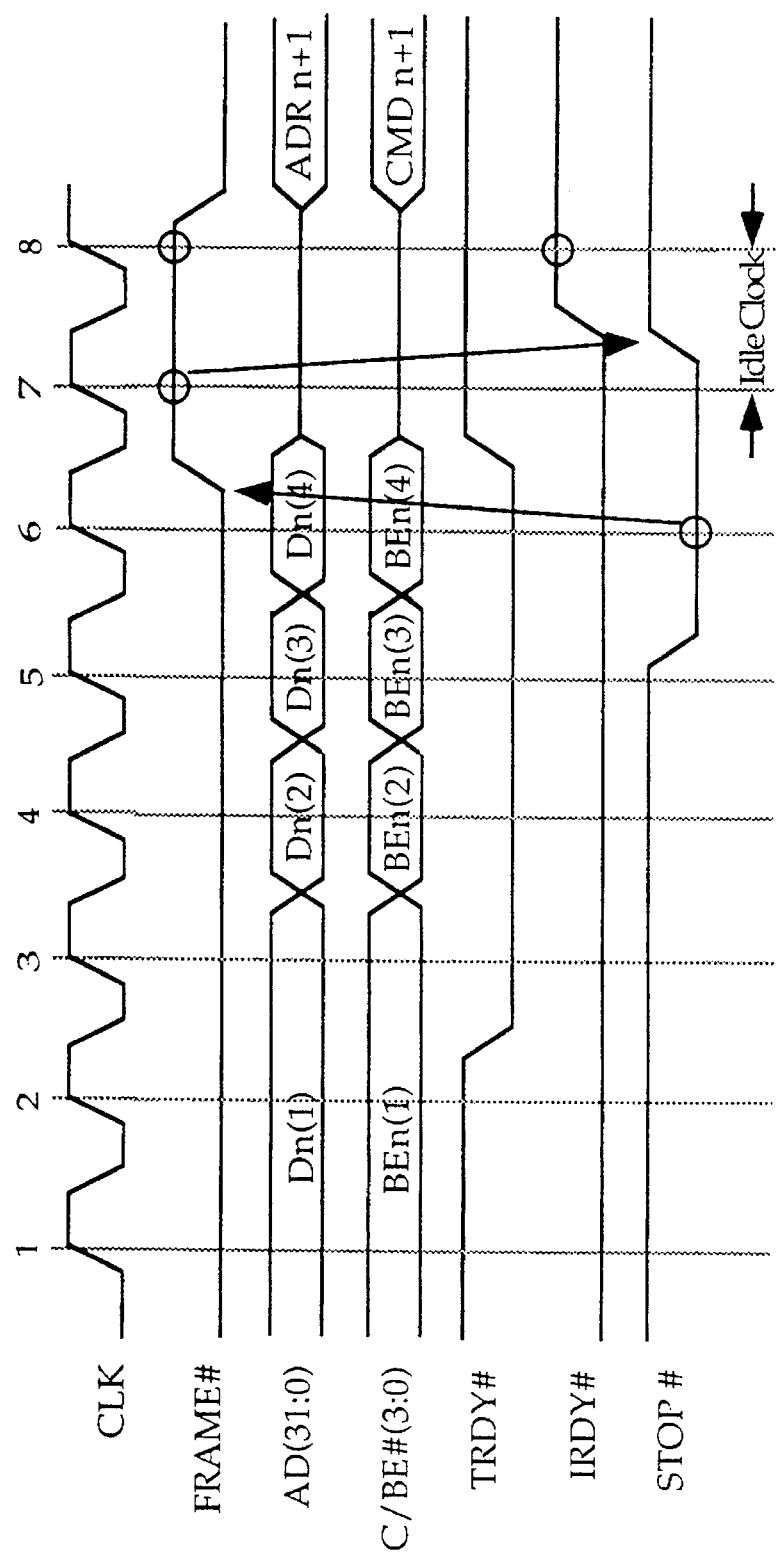
FIG. 4 illustrates the timing of a slave termination request, which is used to terminate a burst access of the shared resource over the peripheral component bus.

FIG. 4 illustrates the timing of a slave termination request, which is used to terminate a burst access of the shared resource (in this example the DRAM subsystem 36) over the peripheral component bus 19. Between times 1 and 2, the AD signal lines of the peripheral component bus 19 carry the first double word, Dn(1), of the final data line allowed in the burst write access. The C/BE# signals indicate the valid bytes carried on the AD signal lines. The period between times 1 and 2 constitutes a wait state while the host bridge circuit 30 is flushing the contents of the write buffer 32 to the DRAM subsystem 36, as discussed above.

Between times 2 and 3, the host bridge circuit 30 (the slave for the burst write sequence) asserts the TRDY# signal low to indicate that the write buffer 32 is free to accept more data. Between times 3 and 4, the bus master for the burst access transmits the second double word Dn(2) over the AD signal lines, and the corresponding BEn(2) over the C/BE# signal lines. Similarly, the bus master begins transmitting the third double word Dn(3) between times 4 and 5, and the fourth double word Dn(4) between times 5 and 6.

Between times 5 and 6, the host bridge circuit asserts the STOP# signal low to indicate a slave termination request, which results from the expiration of the burst counter 31 if more data is pending in the burst access. The bus master for the burst write access samples the STOP# signal on the rising edge of the CLK signal at time 6. Thereafter, the bus master deasserts the FRAME# signal high to indicate the end of the burst write access, and the host bridge circuit 30 deasserts the TRDY# signal high to indicate that the write buffer 32 is full.

At time 7, on the rising edge of the CLK signal, the host bridge circuit 30 samples the FRAME# signal high indicating the end of the burst write sequence. Thereafter, the bus master deasserts the IRDY# signal high, and the host bridge circuit 30 deasserts the STOP# signal high. The period between time 7 and 8 is an idle period for the peripheral component bus 19. On the rising edge of the CLK signal at time 8, the FRAME# signal and the IRDY# signal are both sampled high, which allows initiation of a new bus sequence on the peripheral component bus 19.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are accordingly to be regarded as an illustrative, rather than in a restrictive sense.

What is claimed is:

1. A computer system, comprising:

bridge circuit that enables communication between a host bus and a peripheral bus and that enables access to a shared resource of the computer system from both the host bus and the peripheral bus, the bridge circuit having a write buffer for posting data for transfer to the shared resource and a burst counter that controls a maximum data length for a burst data transfer to the write buffer over the peripheral bus;

processor coupled for communication over the host bus, the processor writing a first count into the burst counter to set the maximum data length for the burst data transfer to the write buffer over the peripheral bus, the processor then determining an access time to the shared resource over the host bus during the burst data transfer to the write buffer over the peripheral bus, the processor then writing a second count into the burst counter to control a maximum data length for a subsequent burst data transfer to the write buffer over the peripheral bus.

2. The computer system of claim 1, wherein the processor writes the second count to the burst counter to reduce the maximum data length for the subsequent burst data transfer in comparison to the maximum data length for the burst data transfer if the access time to the shared resource over the host bus is greater than a predetermined time.

3. The computer system of claim 1, wherein the processor writes the second count to the burst counter to increase the maximum data length for the subsequent burst data transfer in comparison to the maximum data length for the burst data transfer if the access time to the shared resource over the host bus is less than a predetermined time.

4. The computer system of claim 1, wherein the shared resource comprises a DRAM subsystem.

5. The computer system of claim 1, wherein the burst data transfer comprises a series of write cycles on the peripheral bus wherein each write cycle transfers a cache line to the write buffer over the peripheral bus.

6. The computer system of claim 5, wherein the bridge circuit flushes the write buffer to the shared resource and decrements the burst counter after each cache line of the burst data transfer is written to the write buffer.

7. The computer system of claim 6, wherein the bridge circuit signals a slave termination request over the peripheral bus if the burst counter reaches zero and if the peripheral bus carries a signal that indicates that more data is pending in the burst data transfer.

8. The computer system of claim 7, wherein the bridge circuit resets the burst counter to the first count after signaling the slave termination request over the peripheral bus.

9. The computer system of claim 7, wherein the bridge circuit signals the slave termination request by asserting a STOP signal over the peripheral bus, such that the STOP signal causes a bus master that originates the burst data transfer to terminate the burst data transfer.

10. The computer system of claim 6, wherein the bridge circuit asserts a signal over the peripheral bus to stall the burst data transfer while flushing the write buffer to the shared resource.

11. A method for bandwidth allocation to a shared resource in a computer system, comprising the steps of:

coupling a bridge circuit between a host bus and a peripheral bus such that bridge circuit enables communication between the host bus and the peripheral bus and enables access to the shared resource from both the host bus and the peripheral bus;

writing a first count into a burst counter in the bridge circuit that controls a maximum data length for a burst data transfer to a write buffer in the bridge circuit over a peripheral bus, wherein the write buffer buffers data for transfer to the shared resource;

determining an access time to the shared resource over the host bus during the burst data transfer to the write buffer over the peripheral bus;

writing a second count into the burst counter to control a maximum data length for a subsequent burst data transfer to the write buffer over the peripheral bus.

12. The method of claim 11, wherein the second count written to the burst counter reduces the maximum data length for the subsequent burst data transfer in comparison to the maximum data length for the burst data transfer if the access time to the shared resource over the host bus is greater than a predetermined time.

13. The method of claim 11, wherein the second count written to the burst counter increases the maximum data length for the subsequent burst data transfer in comparison to the maximum data length for the burst data transfer if the access time to the shared resource over the host bus is less than a predetermined time.

14. The method of claim 11, wherein the shared resource comprises a DRAM subsystem.

15. The method of claim 11, wherein the burst data transfer comprises a series of write cycles on the peripheral bus wherein each write cycle transfers a cache line to the write buffer over the peripheral bus.

16. The method of claim 15, further comprising the steps of flushing the write buffer to the shared resource and decrementing the burst counter after each cache line of the burst data transfer is written to the write buffer.

17. The method of claim 16, further comprising the step of signaling a slave termination request over the peripheral bus if the burst counter reaches zero and if the peripheral bus carries a signal indicating that more data is pending in the burst data transfer.

18. The method of claim 17, further comprising the step of resetting the burst counter to the first count after the slave termination request over the peripheral bus.

19. The method of claim 17, wherein the step of the slave termination request comprises the step of asserting a STOP signal over the peripheral bus, such that the STOP signal causes a bus master that originates the burst data transfer to terminate the burst data transfer.

20. The method of claim 16, wherein the step of flushing the write buffer to the shared resource comprises the step of asserting a signal over the peripheral bus to stall the burst data transfer while flushing the write buffer to the shared resource.

21. A computer system, comprising:

bridge circuit that enables communication between a host bus and a peripheral bus and that enables access to a shared resource of the computer system from both the host bus and the peripheral bus, the bridge circuit having a write buffer for posting data blocks for transfer to the shared resource and a burst counter that determines a maximum number of data blocks that may be posted in the write buffer during a burst data transfer over the peripheral bus;

processor coupled for communication over the host bus, the processor writing a first count into the burst counter to set the maximum number of data blocks for the burst data transfer over the peripheral bus, the processor then determining an access time to the shared resource over the host bus during the burst data transfer over the peripheral bus, the processor then writing a second count into the burst counter to control a maximum number of data blocks that may be posted in the write buffer during a subsequent burst data transfer over the peripheral bus.

22. The computer system of claim 21, wherein the processor writes the second count to the burst counter to reduce the maximum number of data blocks that may be posted in the write buffer during the subsequent burst data transfer in comparison to the burst data transfer if the access time to the shared resource over the host bus is greater than a predetermined time.

23. The computer system of claim 21, wherein the processor writes the second count to the burst counter to increase the maximum number of data blocks that may be posted in the write buffer during the subsequent burst data transfer in comparison to the burst data transfer if the access time to the shared resource over the host bus is less than a predetermined time.

24. The computer system of claim 21, wherein the shared resource comprises a DRAM subsystem.

25. The computer system of claim 21, wherein the burst data transfer comprises a series of write cycles on the peripheral bus wherein each write cycle contains a cache line for posting to the write buffer over the peripheral bus.

26. The computer system of claim 25, wherein the bridge circuit flushes the write buffer to the shared resource and decrements the burst counter after each cache line of the burst data transfer is written to the write buffer.

27. The computer system of claim 26, wherein the bridge circuit signals a slave termination request over the peripheral bus if the burst counter reaches zero and if the peripheral bus carries a signal that indicates that more data is pending in the burst data transfer.

28. The computer system of claim 27, wherein the bridge circuit resets the burst counter to the first count after signaling the slave termination request over the peripheral bus.

* * * * *

UNITED STATES PATENT AND TRADEMARK OFFICE
CERTIFICATE OF CORRECTION

PATENT NO. : 5,579,530
DATED : November 26, 1996
INVENTOR(S) : Solomon et al.

It is certified that error appears in the above-indentified patent and that said Letters Patent is hereby corrected as shown below:

In column 3 at line 37 delete "315" and insert --35--

In column 3 at line 54 insert --entitled-- following "1992," and prior to "A"

Signed and Sealed this

Eighth Day of July, 1997

Attest:

BRUCE LEHMAN

Attesting Officer

Commissioner of Patents and Trademarks